US011983698B2

(12) United States Patent
Jamkhedkar et al.

(10) Patent No.: US 11,983,698 B2
(45) Date of Patent: May 14, 2024

(54) SYSTEM AND METHOD FOR CARDLESS CASH ACCESS

(71) Applicant: PAYPAL, INC., San Jose, CA (US)

(72) Inventors: Prashant Jamkhedkar, Fremont, CA (US); Jie Leng, San Jose, CA (US); Kaining Gu, Saratoga, CA (US); Buddhika Withanage, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 98 days.

(21) Appl. No.: 17/539,126

(22) Filed: Nov. 30, 2021

(65) Prior Publication Data

US 2022/0084011 A1 Mar. 17, 2022

Related U.S. Application Data

(63) Continuation of application No. 15/695,317, filed on Sep. 5, 2017, now abandoned.

(51) Int. Cl.
*G06Q 20/40* (2012.01)
*G06Q 20/10* (2012.01)
*G06Q 20/32* (2012.01)
*H04L 9/40* (2022.01)

(52) U.S. Cl.
CPC ..... *G06Q 20/3274* (2013.01); *G06Q 20/1085* (2013.01); *G06Q 20/3223* (2013.01); *G06Q 20/325* (2013.01)

(58) Field of Classification Search
None
See application file for complete search history.

(56) References Cited

U.S. PATENT DOCUMENTS

| 6,045,039 | A | 4/2000 | Stinson et al. |
| 10,013,684 | B2 | 7/2018 | Keys et al. |
| 10,354,246 | B1 | 7/2019 | Janiga |
| 2002/0069170 | A1 | 6/2002 | Rizzo et al. |
| 2008/0319869 | A1 | 12/2008 | Carlson et al. |
| 2011/0238573 | A1 | 9/2011 | Varadarajan |
| 2015/0095240 | A1 | 4/2015 | Specogna et al. |
| 2015/0199671 | A1 | 7/2015 | Bajaj et al. |
| 2016/0019537 | A1* | 1/2016 | Raja ..................... G07F 19/203 705/43 |
| 2017/0109718 | A1* | 4/2017 | Raja ................... G06Q 20/1085 |
| 2017/0262823 | A1 | 9/2017 | Hartung |
| 2018/0005206 | A1* | 1/2018 | Belin ................. G06Q 20/1085 |
| 2018/0165663 | A1* | 6/2018 | Naik .................. G06Q 20/3223 |
| 2019/0005474 | A1* | 1/2019 | Cady ................. G06Q 20/3223 |

* cited by examiner

*Primary Examiner* — Bennett M Sigmond
*Assistant Examiner* — Bhavin D Shah
(74) *Attorney, Agent, or Firm* — Haynes and Boone, LLP

(57) ABSTRACT

Aspects of the present disclosure involve systems, methods, devices, and the like for processing a cardless cash transaction. In one embodiment, a system is introduced that enables a communication between a user device and an automated teller machine. The communication disclosure presents a system and method that enables the communication between a user device and an automated teller machine for the withdrawal of a cash amount using a cardless cash option. The withdrawal occurs through the use of a white label platform which pairs the automated teller machine and user device without the use of a card.

20 Claims, 9 Drawing Sheets

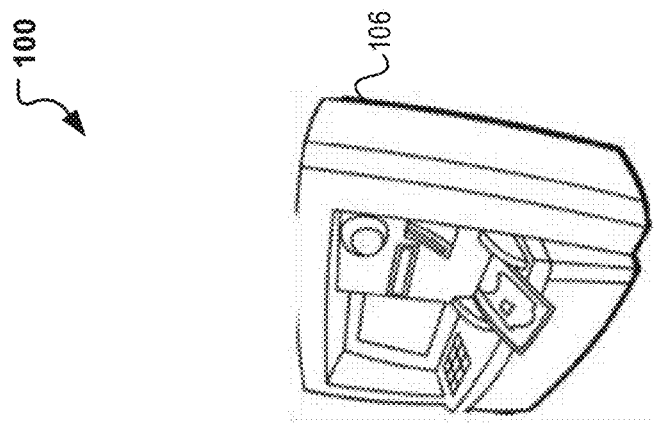
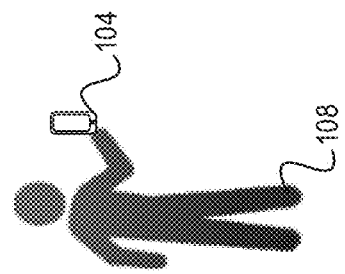
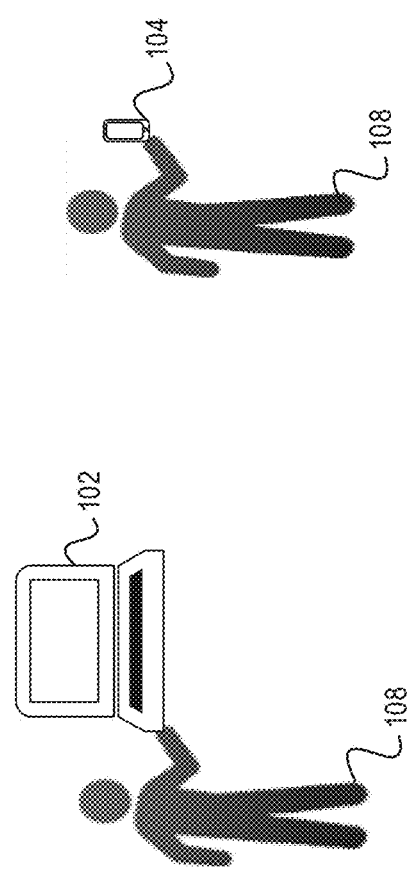
FIG. 1A
FIG. 1B
FIG. 1C

SYSTEM AND METHOD FOR CARDLESS CASH ACCESS

CROSS REFERENCE TO RELATED APPLICATION

This application is a continuation of U.S. application Ser. No. 15/695,317, filed Sep. 5, 2017, the disclosure of which is hereby incorporated by reference in its entirety.

TECHNICAL FIELD

The present disclosure generally relates to automated cash dispensing systems, and more specifically, to cardless cash dispensing systems.

BACKGROUND

Rapid advancements in technology and communications have led to the ubiquitous use of wireless electronics. As such, today's society has grown to become heavily device reliant. This reliance has led to the use of electronics to make monetary transactions for goods and services. For example, a smartphone may now be used to complete a purchase transaction at a merchant location. Unfortunately, the use of electronic devices may be restricted by vendor, location, event, or service. As such, cash may be needed and accessible with the use of a bank card for cash withdrawal. However, the use of a physical card may be cumbersome to carry, susceptible to theft, and costly based on the automated teller machine used. This susceptibility may lead to a loss of time and money and may be frustrating to a user. Therefore, it would be beneficial if a system were created that provides a user with the ability to withdrawal cash without the need for a bank card.

BRIEF DESCRIPTION OF THE FIGURES

FIGS. 1A-1C illustrates block diagrams of a first user interaction with one or more devices for performing a transaction.

Figure 2A:
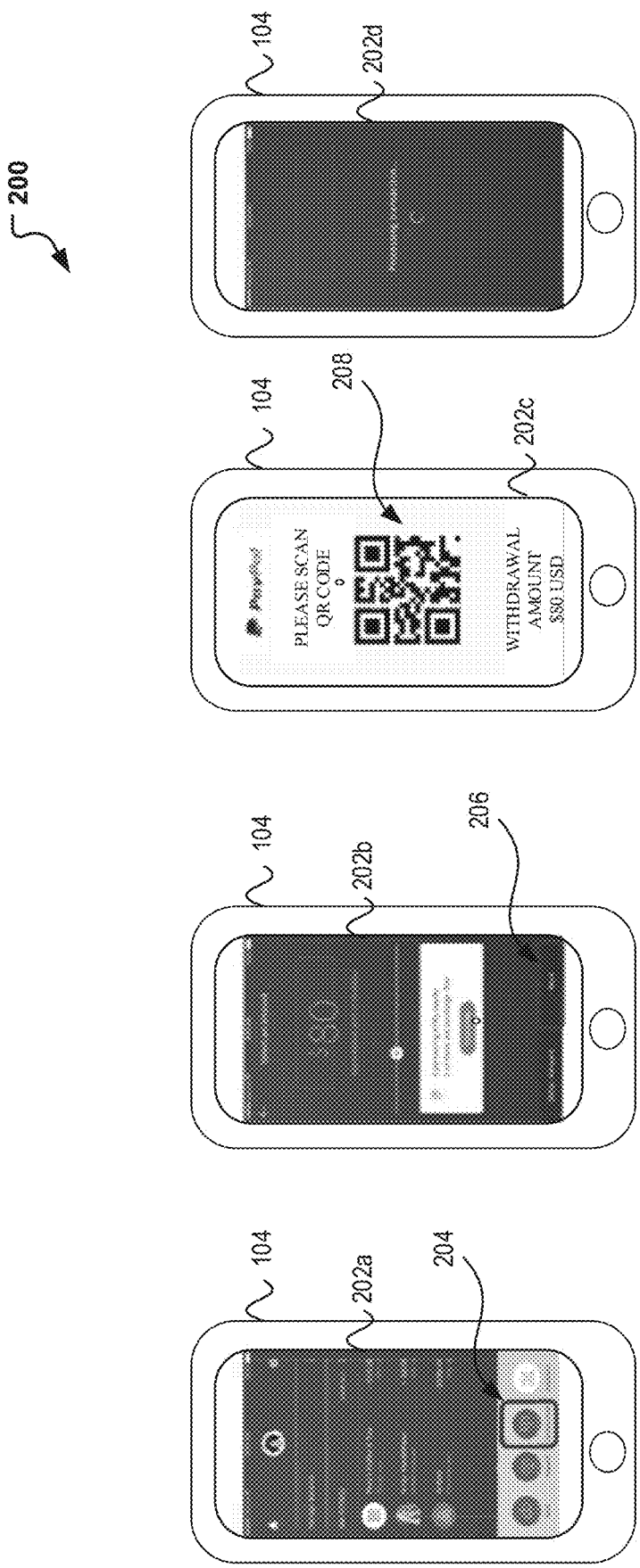
FIGS. 2A-2B illustrates a communication with a user device for cardless cash access.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for processing a cardless cash transaction. In one embodiment, a system is introduced that enables a communication between a user device and an automated teller machine. The communication occurs through the use of a white label platform which enables the request and transfer of authorization, unique codes, and customer information. The use of a white label platform enables tracking the state of withdrawal of cash across multiple steps of communication. In another embodiment, a system is introduced that enables the communication between a user device and an automated teller machine for the withdrawal of a cash amount using a cardless cash option. The withdrawal occurs through the use of a white label platform which pairs the automated teller machine and user device without the use of a card. The withdrawal is initiated at the user device where an amount for withdrawal is indicated and requested. The amount for withdrawal is then dispersed in response to a unique code that is exchanged between the automated teller machine and the user device with the aid of the white label platform.

Rapid advances in communications have made portable electronic devices, such as smartphones and tablets, part of everyday life. Among other things, these electronic devices can be used to browse the web and stream video, and purchase goods and services. In some instances, one or more electronic devices can be used to make the purchase. However, in some instances the establishment, event, service, or the like may have cash only restrictions, making the use of the electronic device useless.

Conventionally, the withdrawal of cash has occurred at an automated teller machine (ATM) using a physical bank card. The user inputs the bank card into the ATM, enters some authentication and transactional information, and the cash is dispensed. Dispensing of cash in such manner, however, may be cumbersome, costly, and inconvenient for users. For example, a user who is a customer to a specific bank, may need to search for an ATM machine associated with that bank in order to avoid fees. As another example, the bank card needs to be carried by the user for completing the cash transaction. Carrying the bank card can lead to a card that is lost or stolen. In addition, the lost/stolen card may cause the user to be subject to loss of money (due to an authorized transaction), identity theft, stress, and frustration.

To illustrate this, FIGS. 1A-1C, include block diagrams of a user interaction with one or more devices for performing a transaction. In FIG. 1A, a user 108 is interacting with a personal device 102 for performing one or more transactions. The personal device 102 may be a tablet, laptop, pc, or the like. For exemplary purposes, personal device 102 can be a laptop. As illustrated in FIG. 1, user 108 is communicating with personal device 102. Generally, personal device 102 can be used for numerous tasks including but not limited to web browsing, video streaming, bill pay, and purchase of goods and services. However, a personal device 102 such as a laptop may be too large, inconvenient, and not very portable for use in everyday purchases. In addition, a personal device would not be useful in instances where cash is used and needed to be withdrawn.

FIG. 1B illustrates user 108 interacting with a user device 104 for performing one or more transactions. The user device 104 may be a tablet, iPad, cell phone or the like. For exemplary purposes, user device 104 can be a smart phone. The smart phone may be equipped with various applications for performing similar tasks as indicated with personal device 102. For example, the user device 104 may be used for web browsing, video streaming, bill payments, and online purchases. Additionally, the user device 104 be equipped with applications that enable the user to make purchases using a payment provider application and/or a digital wallet. Further, the user device 104 is capable of making phone calls and communicating with one or more other communications devices using a cellular network, Wi-Fi, Bluetooth, BLE, NFC, WLAN, etc. The communication can enable the transmission of information from a user account to a secondary source. For example, the user device 104 can be used to make a purchase for a good or service using an application or digital wallet. Here, although the user device 102 is portable and accessible for purchases, the conventional smart phone is limited by the ability to withdraw, deposit, and/or handle cash. Instead, a bank card is needed for the withdrawal and used for the dispensing of cash by an automated teller machine, merchant point-of-sale (POS) device or other similar device. Further, the bank card is largely limited in its use to ATM machines affiliated with the bank. Therefore, in order to mitigate the costs associated with using out of network banks, frustration caused by lost/stolen cards, and possibility theft, a method and system is introduced that alleviates such disadvantages.

FIG. 1C illustrates a user 108 interacting with one or more devices 104, 106 for performing a transaction. As an example, user 108 is simultaneously interacting with an ATM 106 and user device 104. As indicated, although many tasks may be performed using a user device 104, the ability to withdrawal and/or deposit cash is so limited. In a current embodiment, a system and method is introduced that enables cardless cash access without the need for a bank card. In particular, a system is introduced that enables the communication between the ATM 106 and the user device 104 for the deposit and/or withdrawal of cash.

In one embodiment, the withdrawal of cash (and/or deposit) may occur with the use of an application on the user device 104. For example, the user device 104 may open an application (e.g., payment provider application) that enables the communication with the ATM for cardless cash access. To communicate, near field communications, cellular, Bluetooth and/or other communication network may be used singly or in combination to enable the request, authorization and dispensing of cash. In one embodiment, the use of a white label platform is introduced which may have access to numerous ATM vendors (greater than 100,000) and provides a means for a customer to use a mobile device (or other user device 104) and a QR code mechanism to pair the ATM and the user device for the withdrawal of cash. Thus, users are exposed to peer-to-peer (P2P) funds without the use of a card.

Note that in some embodiments, location services may be used for detection of the user device 104 which would automatically prompt a user if a cash withdrawal and/or deposit is needed when in proximity to an ATM 104. In other embodiments, the user may enable the service by manually opening the application desired.

Figure 2B:
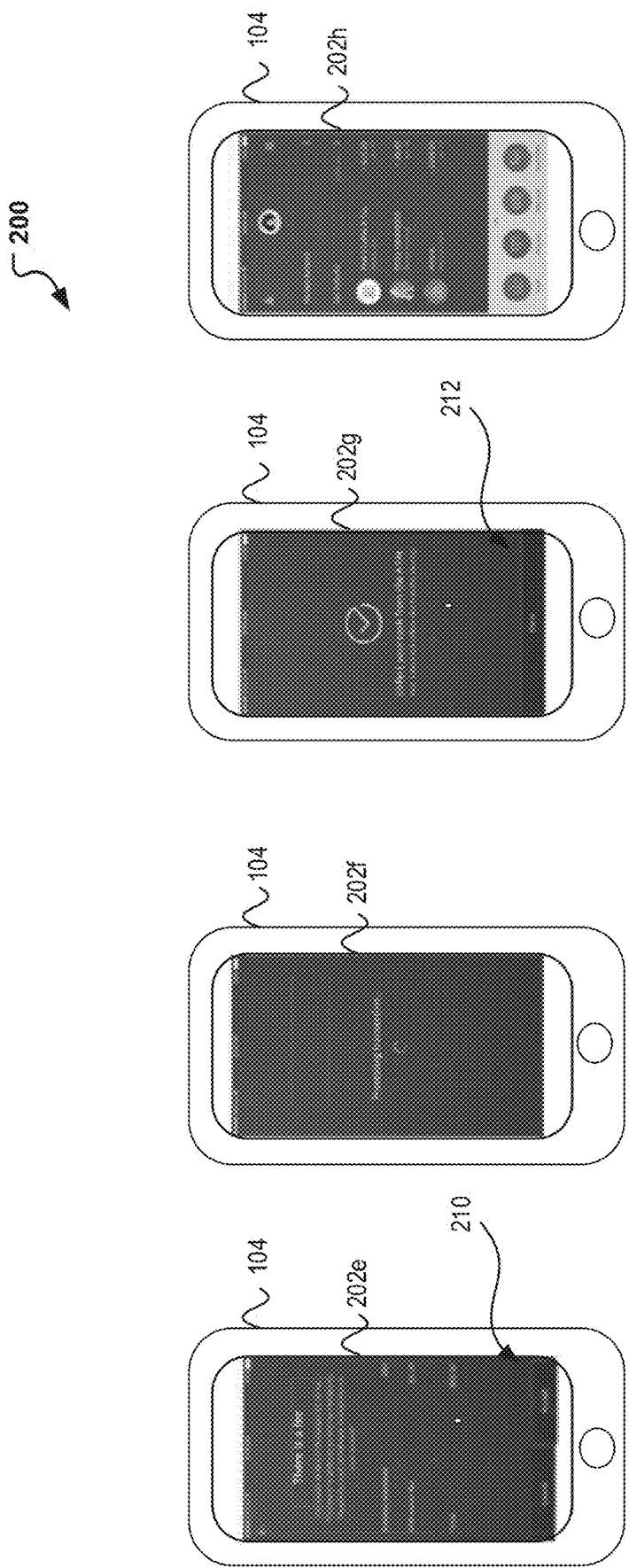
Figure 3:
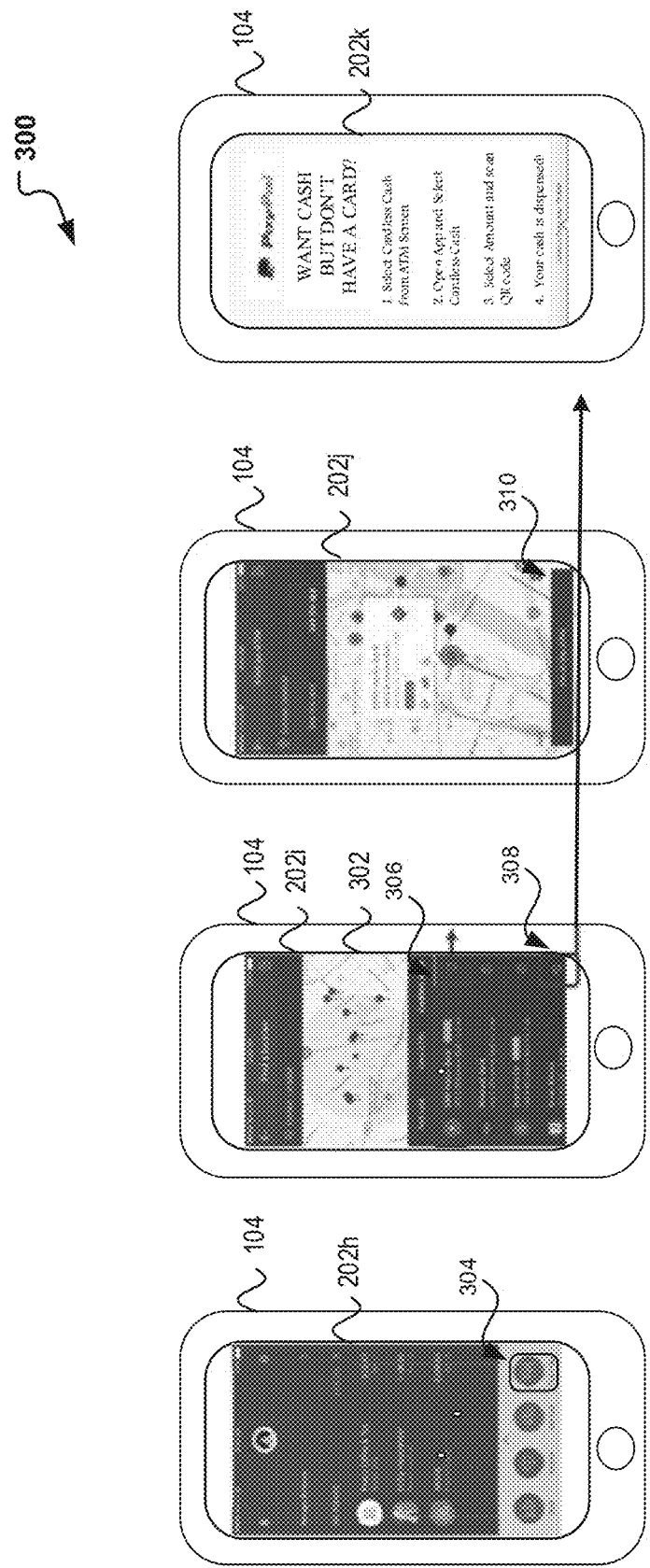
FIG. 3 illustrates another communication with a user device for cardless cash access.
Figure 4:
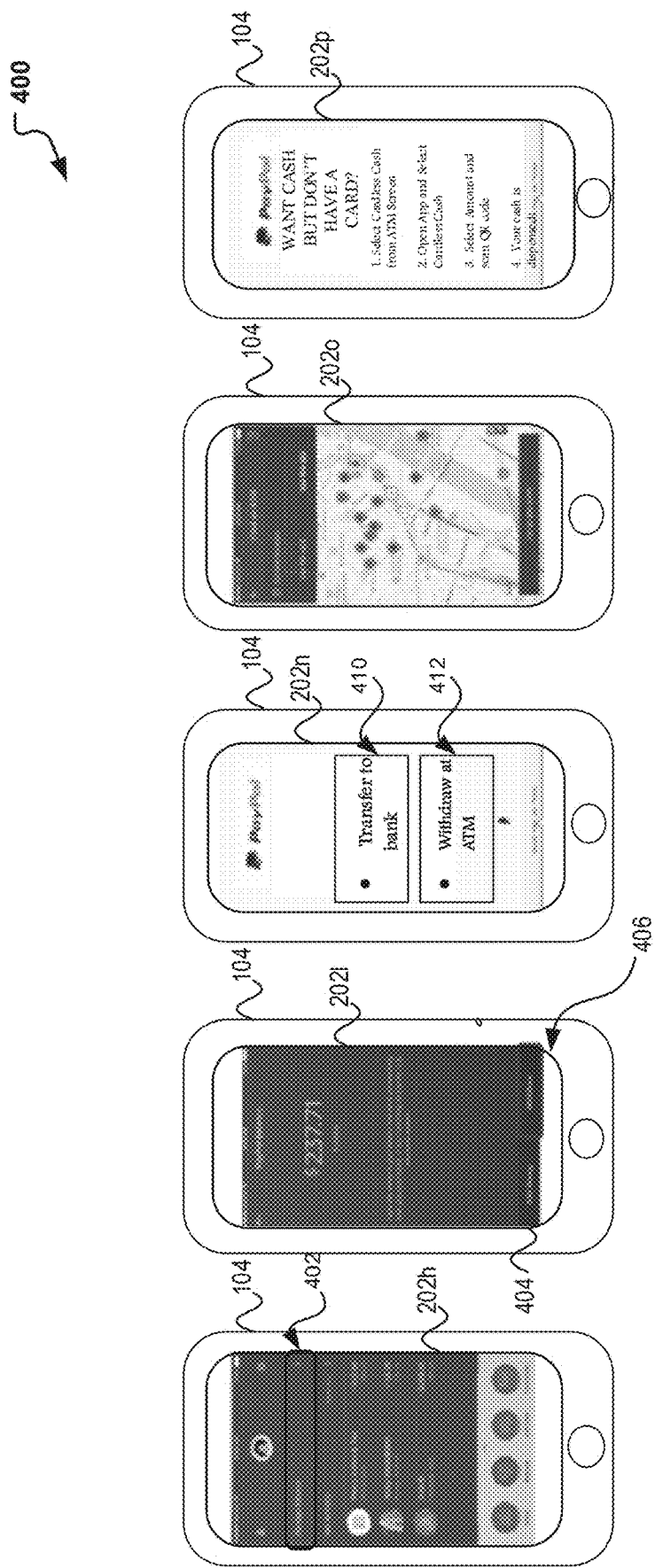
FIG. 4 illustrates yet another communication with a user device for cardless cash access.

FIGS. 2-4 provide exemplary embodiments illustrating a communication over a user device 104 for cardless cash access. Note that FIGS. 2-4 are for exemplary purposes only and other methods, flows, and user interfaces may be contemplated. In addition, although the process is illustrated as beginning at the user device 104, the process of beginning the transaction may occur at the ATM 106.

FIGS. 2A-2B illustrate the communication 200 over a user device 104 for cardless cash access that begins at a homepage of an application. For exemplary purposes, a PayPal application will be used for illustrating various user interfaces 202 that may appear on a user device 104 as a user 108 is in the process of obtaining cash from another device (e.g., ATM 106) without the use of a bank card.

In some embodiments, the communication 200 is initiated by a user 108 when opening the PayPal application and is presented with the homepage UI 202a which provides the option to select the cardless cash function. Additionally, the homepage UI 202a may include other details and functions. For example, the homepage UI 202a may include profile information (e.g. name, photo, user name), recent activity (e.g., purchases and/or deposits), as well as other functions (e.g., option to transfer, deposit, request, withdrawal cash). As another example, the homepage UI 202a may include the option to locate nearby locations (e.g., ATMs 106, merchant POS and the like) where cash may be withdrawn. As illustrated in homepage UI 202a, a cardless cash icon 204 may be selected to initiate the communication.

Note that in some instances, the application may automatically open and present the user 108 with the option to withdraw, if and/or when the user device 104 detects an ATM 106 within proximity. Detection of the ATM 106 may be accomplished using GPS, cellular, beacon, or other network system or combination of systems (e.g., using triangulation).

Once the cardless cash icon 204 is selected, the user 108 may be routed to an amount UI 202b, where the user 108 may select the monetary amount to withdraw. In some instances, user's available balance may be provided as a reference. In addition, the amount for withdrawal may be prepopulated (based on previous transactions) to a specific amount. In some instances, the system can use machine learning, transaction history, predictive analysis or the like, to determine either based on the merchant, location, balance, or other, the amount to display. For example, the system can determine that the user 108 is in proximity to an ATM located outside a hair salon which was previously used. Using historical data, the system can present a $100 amount withdrawal option since the user last withdrew this amount on a similar trip.

Alternatively, the amount presented may be blank to enable user input. The amount may be input and/or adjusted using a number pad, slider or other similar mechanism that would enable the user 108 to designate the desired amount. Upon entering the desired amount, a next option 206 may be selected. Alternatively, other amounts may be added for withdrawal from this account or other account tied to the application. If the next option 206 is selected, then a communication between the user device 104 and ATM 106 occurs where details regarding the transaction, user, amount and authorization is exchanged. Details regarding this communication is detailed below and in conjunction with FIG. 5. Also, further to the indication of a monetary amount, the amount UI 202b can include details regarding ATMS in the proximity that may be used for the transaction. In some instances, in addition to the identification of nearby ATMs, the user 108 may also be presented with details regarding any fees and/or amenities available at each ATM 106.

Next, in order for the ATM 106 to authenticate the dispensing of funds, a unique authentication mechanism is exchanged between the user device 104 and the ATM 106. In some embodiments, the authentication may come in the form of a QR code 208. The QR code 208 as illustrated in UI 202c may be presented on the ATM screen and scanned by a camera (not shown) located in the user device 104. Alternatively, the user device 104 can display the QR code 208 to be scanned at ATM 106.

Note that the use of a QR code for authentication is not so limited and other forms of authentication can be exchanged between the devices 104, 106. For example, the unique authentication mechanism may come in the form of a PIN, a sequence, a picture, or other similar codes. In addition, other information may also be provided in conjunction with the code. For example, the amount to be withdrawn, location of the ATM, time of day, merchant location (if using a POS), etc. may be included on the UI 202c. Further, a combination of codes and/or metrics may be used. For example, a biometric (e.g., fingerprint, eye scan, etc.) in conjunction with the code may be presented.

Once the QR code 208 is received, recognized, and confirmed, transaction processing may occur, as illustrated in processing UI 202d. During the processing, external networking interaction may occur with the ATM 106 and/or user device 104. Note that this will be described below and in conjunction with FIG. 5.

Upon completion of the processing, the cash may be dispensed at the ATM 106. Alternatively, if a fee is associated with the transaction, a fee UI 202e may prompt the user 108 whether he/she wishes to continue with the transaction which includes the additional fee. The fee UI 202e can include details on the amount of the fee and total to be withdrawn with the option to cancel or accept the transaction. If the accept option 210 is confirmed, the processing UI 202f is illustrated indicating that the transaction with the now added fee is being processed through the credit card network (or other authorization network). Once the transaction has been approved, the cash is dispensed and may be collected as indicated by confirmation UI 202g. If the transaction is completed, the user 108 may finalize by selecting the Done option 212.

As indicated, there exists numerous options for accessing cash without a card using an application on the user device 104. Turning to FIG. 3, another communication with a user device 104 for cardless cash access is illustrated. In particular, FIG. 3 illustrates an option where cashless card access may be obtained from the homepage UI 202h by first locating ATM(s) 106 within the vicinity of the user 108 by selecting a Find ATMs option 210. Selecting the Find ATMs option 210 can provide the user 108 with not only a listing UI 202i of relevant ATMs 106 but also provide a map 302 indicating the currently location of the user 108 and the locations 306 of the ATMs 106 relative to the user 108. The ATMs 106 presented may be stand alone, in, around, and/or affiliated with banks, grocery stores, merchants, convenient stores, etc. The ATMs 106 presented can also include POS systems and the like where cash may be dispersed and/or deposited.

If, at listing 202i, the user 108 is still unsure of the process for dispensing cash using the cardless cash access method, an information radio button 308 may be selected for obtaining details on the cashless card access instructions UI 202k. The cashless card access instructions can provide the user with step-by-step instructions on how to obtain the cash. Additionally, the instructions can also include details on how to deposit cash and/or a combination of both depositing an amount to one account and withdrawing from another.

Listing UI 202i may also include addresses, fees, distance, and additional bank details associated with each ATM 106. Further, if an ATM 106 is selected from the listing, details regarding the particular ATM 106 may be presented on a details UI 202j. The ATM 106 may be associated with a grocer, merchant, bank or other. In one embodiment, where the ATM 106 selected is associated with a bank (e.g., BMO Harris bank), details UI 202j can provide information regarding bank address, phone number, hours of operation, fees, drive-through options, wheel chair accessibility, ratings, reviews, and the option to get directions to the ATM 106. In some instances, the ATM details and access on UI 202j may be presented via other applications such as via Apple Maps and/or Google Maps.

Once at the desired ATM 106, devices 104,106 communicate for withdrawing the cash. Note that at details UI 202j, an option (e.g., I'm at the ATM) may 310 may appear which can guide the user 108 to a corresponding UI 202 for the withdrawal.

FIG. 4 provides yet another communication between the user device 104 and an ATM 106 for cardless cash access. In particular, FIG. 4 illustrates an option where cashless card access is initiated from the homepage UI 202h by selecting an option to manage the account balance 402. This option may be presented to for existing user familiarity and ease of use. At the balance UI 202l, available funds for withdrawal may be presented as well the option to add 404 or withdrawal funds 406. If the option to withdrawal funds 406 is selected, then the user 108 may be routed to a designation UI 202n, where the user 108 can designate where the funds to be withdrawn should go. Bank option 410 provides a user a 1 with the option to withdraw from the available balance and transfer into a bank account, while ATM option 412 can provide the user 108 with access the cash at an ATM 106.

If the user desires to pursue a cardless cash withdrawal, then upon selecting the ATM option 412, the user 108 can be routed to ATM locations UI 202o and/or instructions UI 202p. Cardless cash access then continues in one of the previously described methods above and in conjunction with FIGS. 2 and 3.

Note that any application and combination of user interfaces may be used and presented. Also, the cardless cash withdrawal is not limited to the use between a smart phone and/or an ATM 106. For example, the user device 102 may include a tablet, fitness tracker, VR device, while the other device may include a POS system and other similar systems capable of dispensing and/or withdrawing cash.

Figure 5:
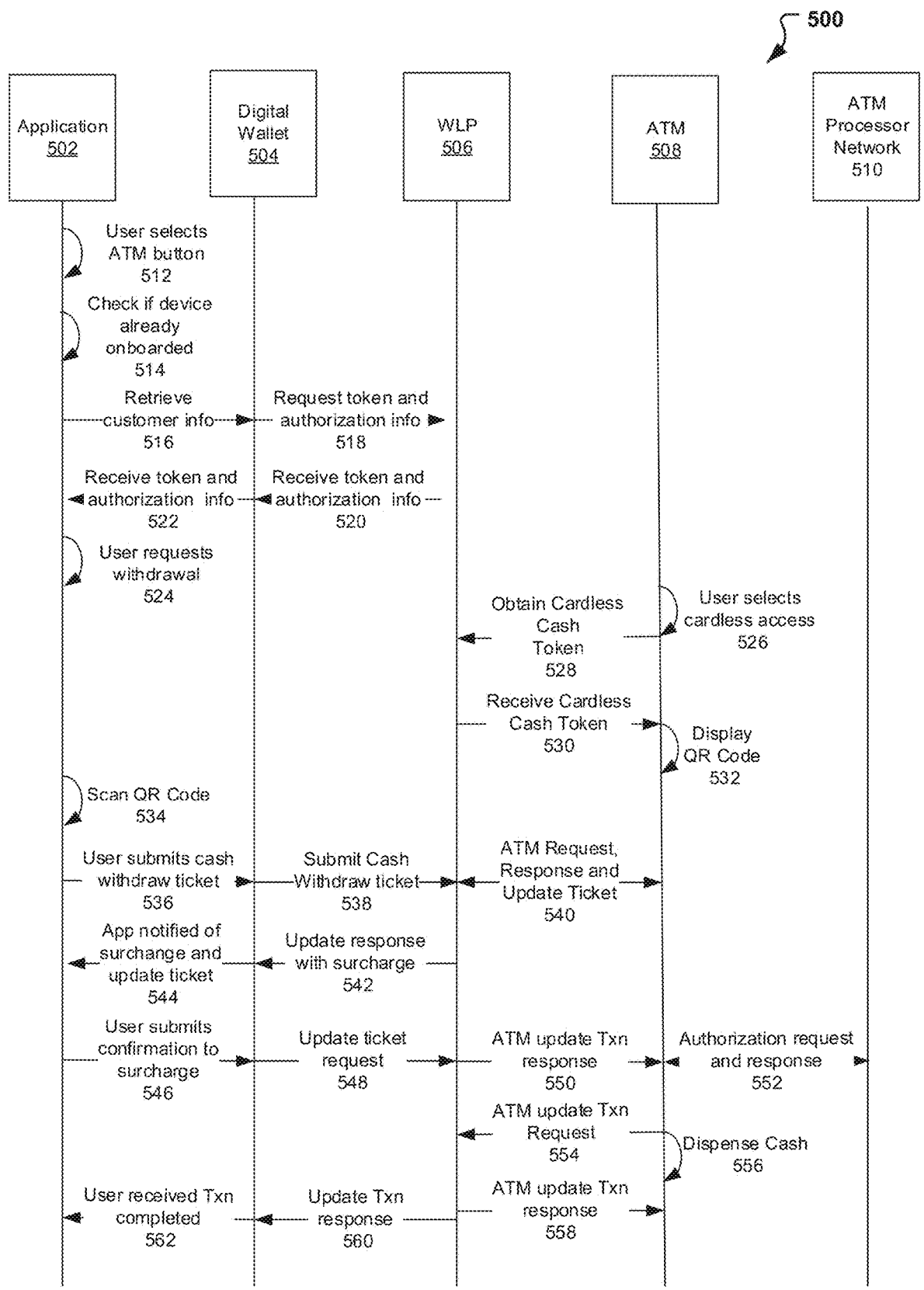
FIG. 5 illustrates a timing diagram of communication between a user device and an automated teller machine (ATM) for cardless cash access.

Turning to FIG. 5, a timing diagram 500 is presented that illustrates the communication and processing that may occur during a cardless cash withdrawal. In some embodiments, to initiate a cashless card access, the transaction will generally begin with a selection of a cashless card withdrawal. Timing diagram 500 of FIG. 5 begins the communication with a user 108 making a selection on the application (e.g., selecting an ATM button 512 or cardless cash option 204) to initiate an ATM transaction. The selection initiates the process that then checks if the user 108 has been previously onboarded 514.

In some embodiments, to onboard a user 108, when a consumer first logs into a payment provider application (e.g., PayPal app), an one-time user authentication code is generated. This one-time user authentication code is then used by a digital wallet backend to obtain a non-transactional token that is associated with the user device 104. This non-transactional token is then used for obtaining the user's 108 uniform resource identifiers (URI) (e.g., customer UEI, device URI, payment accounts URI, etc.) which will be used by the white label platform 506 to pair the request from the user device 104 from the device application 502 with the ATM 508. The onboarding can occur prior to a consumer selecting the ATM button 512 or can occur at the time of the selection, if upon checking 514 it is determined that the user has not been onboarded.

Once onboarded, user information may be retrieve 516 from the user's digital wallet 504. The digital wallet 504 then communicates with a white label platform (WLP) 506 for requesting 518, retrieving 520, and providing 522 this information to the application 502. User information may include any information that may relevant for the transaction including but not limited to device identification, token, and magnes ID, authentication information and uniform resources identifiers. Once the information is received, the user 108 is able to indicate a withdrawal amount and request the withdrawal 524 (e.g., amount UI 202b).

Note that the white label platform 506 is a system that provides the infrastructure that enables the communication with the ATM networks. This infrastructure includes the ability to maintain state of communication between ATM 508 and application 502. In addition, it is a platform that may include mobile payments, loyalty, offers, ATM cash access and other related commerce services through the use of mobile wallet.

As indicated above and in conjunction with FIGS. 2-4, ATM locations may be requested and located that are within the vicinity of the user 108. Thus, once at the ATM 108, a user may select the option for cardless access 526. Note that in some instances, the user 108 may already be at an ATM and timing diagram 500 may begin at the ATM 508 where the user 108 selects the cardless access 526 and then initiates the communication on the user device 104 using the ATM button 512 on the application 502.

Upon selecting the cardless access 526 option on the ATM 508, a cashless card token is requested from the WLP 506. Recall that the WLP 506 is the platform that pairs the ATM 508 with the user device 108 for the cash withdrawal. The WLP 506 provides the token that is received 530 and enables the production of a QR code on the display 532 of the ATM 508 and gets scanned 534 by the camera on the user device 104 (e.g., UI 202c). Scanning the QR code 538 by the user device 104 begins a communication that goes from the application 502 through the ATM 508. During this communication, a cash withdraw ticket is submitted 536, 538 at the application 502 to the digital wallet 504 and received at the WLP 506. The ticket is then requested at the ATM 508 and a response is generated and updated 540 with details regarding a surcharge is communicated to the WLP 506. Note that in some instances, the ATM machine may be fee free and no surcharge may be added.

In the case where a surcharge is added, an updated response with the surcharge is transmitted 542 from the WLP 506 to the Digital Wallet 542 and a notification is transmitted and displayed 546 with the updated ticket including the surcharge at the user device application 502. The ATM user may then agree to the surcharge through a confirmation sent and submitted 546 at the application 502. The updated request confirming the transaction is sent 548 from the digital wallet back to the WLP 506 where the WLP bins the communication with the ATM and ATM networks 510. The ATM receives 550 the user confirmation including the updated transaction and communicates with the ATM networks for the processing of the cash withdrawal.

At the ATM networks 510, the communication includes a request for and response with authorization of the cash withdrawal 552. To process the request, the communication can go through multiple hops including sending it through an acquiring processor (e.g., Financial Information System (FIS)) to a network (e.g., NYCE Payment networks) which look at a unique number transmitted and route the request to the issuer processor (e.g., First Data Resources (FDR)) where the request is recognized and sends it to the payment provider or issuer (e.g., PayPal).

Next, the authorization response 552 transmitted by the ATM networks 510 triggers an updated transmission request (which submits a processed payments) to the WLP 506 and the dispersing of cash 556 at the ATM 508. The WLP 506 responds to the ATM with an updated transmission response 558 including an updated transaction confirmation. Additionally, the WLP 506 also transmits 560 the updated response to the digital wallet 504 and to the application 502 in the form of a message that the transaction is now complete 562.

Figure 6:
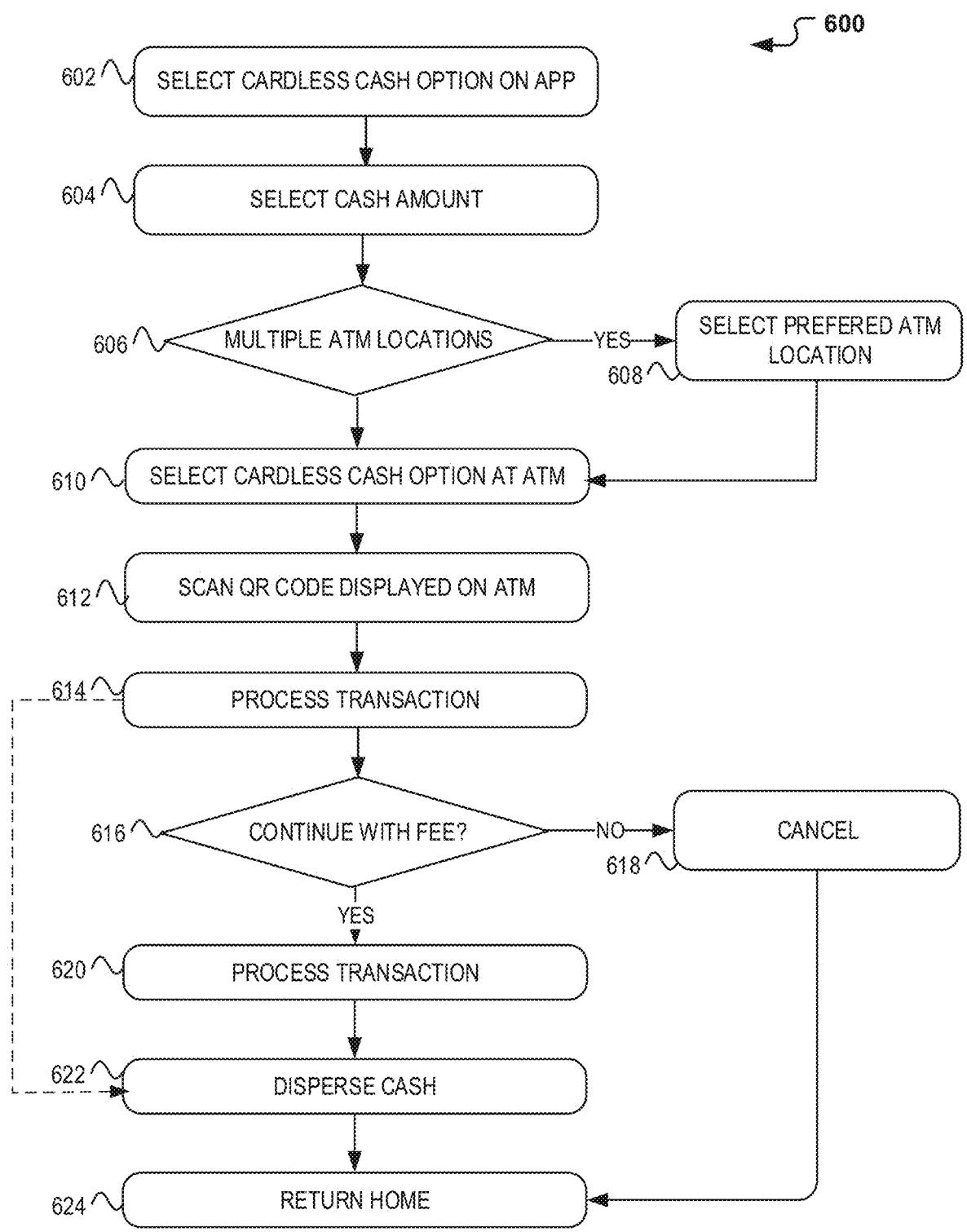
FIG. 6 illustrates a flow diagram of a method for withdrawing cash using cardless cash access.

FIG. 6 illustrates an example process 600 for completing a cardless cash access transaction by a system, as described by the block diagrams of FIGS. 2-4 and/or timing diagram 500 of FIG. 5. In particular, FIG. 6 includes a flow diagram illustrating operations for withdrawing cash using cardless cash access. According to some embodiments, process 600 may include one or more of operations 602-624, which may be implemented, at least in part, in the form of executable code stored on a non-transitory, tangible, machine readable media that, when run on one or more hardware processors, may cause a system to perform one or more of the operations 602-624.

Process 600 begins with operation 602, where a cardless cash option is selected on an application of a user device. As indicated above and in conjunction with FIGS. 2-4, the cardless cash option is available from various locations within the application. For example, the cardless cash option may be initiated when the user is at the homepage of the application, after first locating surrounding ATMs and/or after inquiring about an account balance. To continue with the cardless cash transaction, upon making this selection, the system will check for user onboarding details. If the user has not been on-boarded, the system triggers a just-in-time onboarding communication which will enable this and other user cardless transactions. The just-in-time onboarding communication will occur between the application and a white label platform which will include the exchange of information between the two systems. For example, the communication will include the request and transmission of user information, authentication codes, non-transactional tokens and URIs. (Not shown in process 600).

Once on-boarded and after the selection of a cardless cash option on the application, process 600 will continue to operation 604, where a dollar amount to be withdrawn is input by the user. The monetary amount may be input via a sliding ruler, a numeric pad, a symbol selection (+−), or other symbol/image indicating and increase/decrease in dollar amount. Selection of the amount will then trigger a communication at least between the application, wallet and WLP.

At operation 606, the user then has the opportunity to select an option which identifies ATM locations in the vicinity. The ATMs within proximity can be presented on a map, presented on a list, table, pop-up or the like. In addition, the ATM locations can include details regarding the distance, location, affiliations, fees, hours of operation, etc. If multiple ATMs exists within the vicinity, the user has the option of selecting the desired ATM at operation 608. At operation 608, directions to the desired ATM may be provided, which may be presented using Google Maps®, Mapquest®, or other built-in mapping application. Alternatively, if only one ATM is present or if the user is already at the desired ATM, operation 606 continues to operation 610.

At operation 610, the user selects the option to perform a cardless cash transaction at the ATM. Note that alternatively, the selection of the cardless cash transaction at the ATM may occur at operation 602 prior to or while also initiating the option on the application on the user device. At operation 610 initiates the communication between the ATM and the WLP for a cardless cash token. In response, at operation 612 a QR code is displayed on the screen of the ATM for scan by the user device. Alternatively, the user device may display the QR code and present it to be scanned by the ATM.

By scanning the QR code at operation 612, the user device communicates with the WLP and consequently the ATM with a ticket request for a cash withdrawal. In some instances, a fee may be charged by the associated ATM. This fee/surcharged is communicated by the ATM through the WLP to the application. At operation 616, the application may prompt the user whether he/she would like to continue with the withdrawal and fee. If the user does not wish to pay for the fee, the transaction may be cancelled at operation 618. Alternatively, if the user wishes to continue the transaction included the fee will be processed at operation 620.

At operation 620, if the user submits a confirmation for the surcharge, then the updated confirming request is transmitted to the ATM through the WLP. The ATM then communicates with the ATM networks for the authorization of the cash dispersion. At the ATM Networks, several other platforms and networks may communicate with each other in order to provide the authorization. For example, the communication can go through multiple hops including sending the request from the ATM network to an acquiring processor, to a payment network which look at a unique number transmitted and route the request to the issuer processor where the request is recognized and sent it to the issuer. Successful authentication will lead to an updated request indicating the processed payment to the ATM where successful completion of the transaction processing will lead to operation 622, where the cash is dispense. Upon cash dispensing, the WLP will also communicate through the digital wallet and to the application where a notification is transmitted indicating the completion of the transaction and in some instance the return to the application home screen at operation 624.

Note that in some instances, the ATM may not have an associated surcharge which can lead to a communication with the ATM networks for the authorization of the cash withdraw. If authenticated, then the process may continue to operation 622 where the cash is dispensed as illustrated by the optional dashed line.

Figure 7:
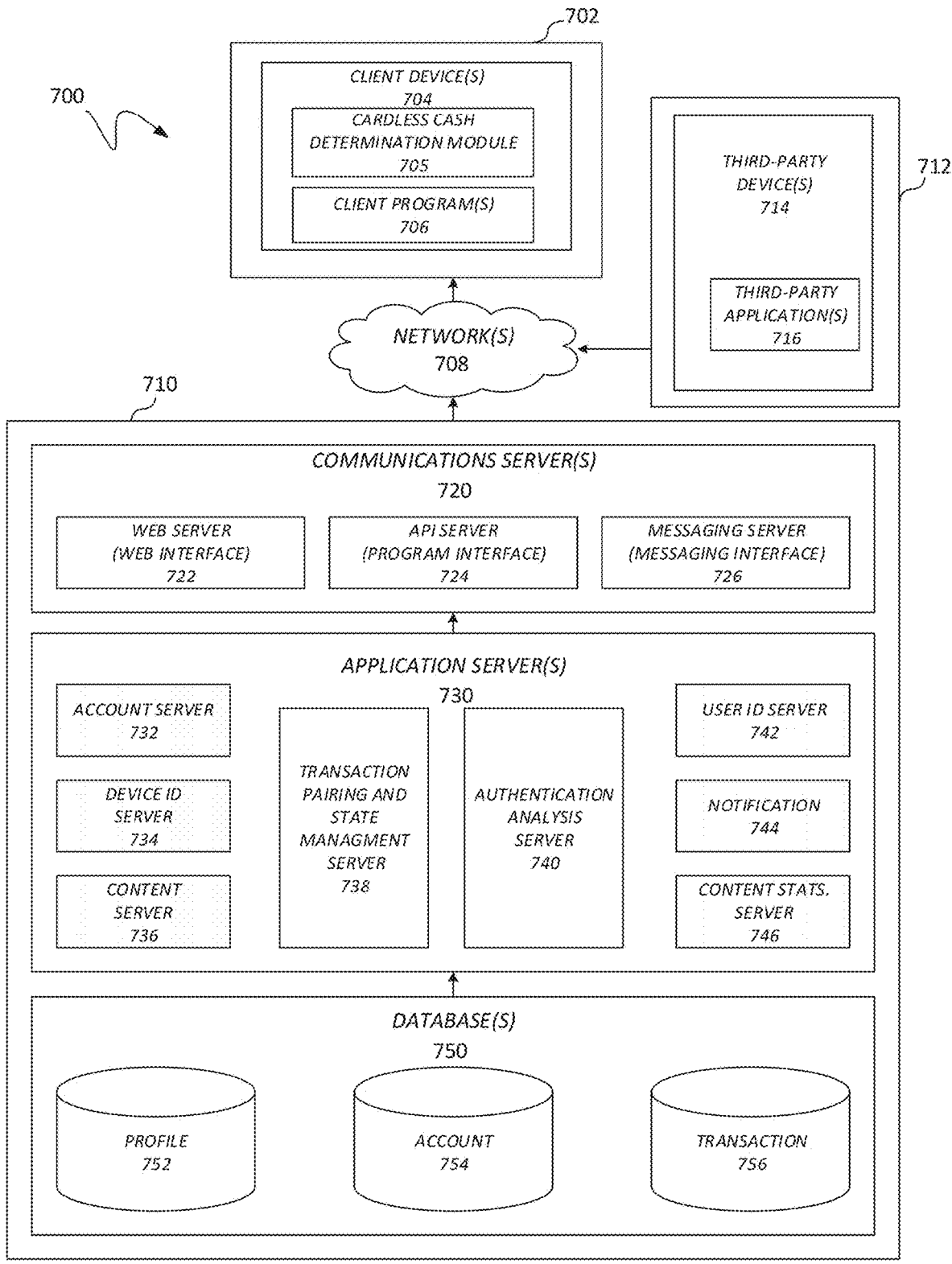
FIG. 7 illustrates a block diagram of a system for enabling cardless cash access.

FIG. 7 illustrates, in block diagram format, an example embodiment of a computing environment adapted for implementing a system for queue reduction. As shown, a computing environment 700 may comprise or implement a plurality of servers and/or software components that operate to perform various methodologies in accordance with the described embodiments. Severs may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 4 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing environment 700 may include, among various devices, servers, databases and other elements, one or more clients 702 that may comprise or employ one or more client devices 704, such as a laptop, a mobile computing device, a tablet, a PC, a wearable device, and/or any other computing device having computing and/or communications capabilities in accordance with the described embodiments. Client devices 404 may include a cellular telephone, smart phone, electronic wearable device (e.g., smart watch, virtual reality headset), or other similar mobile devices that a user may carry on or about his or her person and access readily.

Client devices 704 generally may provide one or more client programs 706, such as system programs and application programs to perform various computing and/or communications operations. Some example system programs may include, without limitation, an operating system (e.g., MICROSOFT® OS, UNIX® OS, LINUX® OS, Symbian OS™ Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Some example application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 706 may display various graphical user interfaces (GUIs) to present information to and/or receive information from one or more users of client devices 704. In some embodiments, client programs 706 may include one or more applications configured to conduct some or all of the functionalities and/or processes discussed below.

Client device 704 (e.g., device 104) may also include a cardless cash determination module 705, that can be used in network-based system 710 to determine if a cardless cash withdrawal has been requested, to communicate with one or more devices for access and authorization of the withdrawal and at least for enabling the transaction.

As shown, client devices 704 may be communicatively coupled via one or more networks 708 to a network-based system 710. Network-based system 710 may be structured, arranged, and/or configured to allow client 702 to establish one or more communications sessions between network-based system 710 and various computing devices 704 and/or client programs 706. Accordingly, a communications session between client devices 704 and network-based system 710 may involve the unidirectional and/or bidirectional exchange of information and may occur over one or more types of networks 708 depending on the mode of communication. While the embodiment of FIG. 7 illustrates a computing environment 700 deployed in a client-server operating relationship, it is to be understood that other suitable operating environments, relationships, and/or architectures may be used in accordance with the described embodiments.

Data communications between client devices 704 and the network-based system 710 may be sent and received over one or more networks 708 such as the Internet, a WAN, a WWAN, a WLAN, a mobile telephone network, a landline telephone network, personal area network, as well as other suitable networks. For example, client devices 704 may communicate with network-based system 710 over the Internet or other suitable WAN by sending and or receiving information via interaction with a web site, e-mail, IM session, and/or video messaging session. Any of a wide variety of suitable communication types between client devices 704 and system 710 may take place, as will be readily appreciated. In particular, wireless communications of any suitable form may take place between client device 704 and system 710, such as that which often occurs in the case of mobile phones or other personal and/or mobile devices.

In various embodiments, computing environment 700 may include, among other elements, a third party 712 (e.g., ATM, merchant POS systems, etc.), which may comprise or employ third-party devices 714 hosting third-party applications 716. In various implementations, third-party devices 714 and/or third-party applications 716 may host applications associated with or employed by a third party 712. For example, third-party devices 714 and/or third-party applications 716 may enable network-based system 710 to provide client 702 and/or system 710 with additional services and/or information, such as merchant information, data communications, payment services, security functions, customer support, and/or other services, some of which will be discussed in greater detail below. Third-party devices 714 and/or third-party applications 716 may also provide system 710 and/or client 702 with other information and/or services, such as email services and/or information, property transfer and/or handling, purchase services and/or information, and/or other online services and/or information.

In one embodiment, third-party devices 714 may include one or more servers, such as a transaction server that manages and archives transactions. In some embodiments, the third-party devices may include a purchase database that can provide information regarding purchases of different items and/or products. In yet another embodiment, third-party severs 514 may include one or more servers for aggregating consumer data, tokens, authentication information, user profiles, and the like.

Network-based system 710 may comprise one or more communications servers 720 to provide suitable interfaces that enable communication using various modes of communication and/or via one or more networks 708. Communications servers 720 may include a web server 722, an API server 724, and/or a messaging server 726 to provide interfaces to one or more application servers 730. Application servers 730 of network-based system 710 may be structured, arranged, and/or configured to provide various online services, merchant identification services, merchant information services, purchasing services, monetary transfers, money withdrawals, money deposits, checkout processing, data gathering, data analysis, and other services to users that access network-based system 710. In various embodiments, client devices 704 and/or third-party devices 714 may communicate with application servers 730 of network-based system 710 via one or more of a web interface provided by web server 722, a programmatic interface provided by API server 724, and/or a messaging interface provided by messaging server 726. It may be appreciated that web server 722, API server 724, and messaging server 726 may be structured, arranged, and/or configured to communicate with various types of client devices 704, third-party devices 714, third-party applications 716, and/or client programs 706 and may interoperate with each other in some implementations.

Web server 722 may be arranged to communicate with web clients and/or applications such as a web browser, web browser toolbar, desktop widget, mobile widget, web-based application, web-based interpreter, virtual machine, mobile applications, and so forth. API server 724 may be arranged to communicate with various client programs 706 and/or a third-party application 716 comprising an implementation of API for network-based system 710. Messaging server 726 may be arranged to communicate with various messaging clients and/or applications such as e-mail, IM, SMS, MMS, telephone, VoIP, video messaging, IRC, and so forth, and messaging server 726 may provide a messaging interface to enable access by client 702 and/or third party 712 to the various services and functions provided by application servers 730.

Application servers 730 of network-based system 710 may be a server that provides various services to clients including, but not limited to, data analysis, geofence management, order processing, checkout processing, cash withdrawal, location services, and/or the like. Application server 730 of network-based system 710 may provide services to a third party merchants such as real time consumer metric visualizations, real time purchase information, and/or the like. Application servers 730 may include an account server 732, device identification server 734, content server 736, transaction pairing and state management server 738, purchase, authentication analysis server 740, user identification server 742, notification server 744, and/or content statistics server 746. These servers, which may be in addition to other servers, may be structured and arranged to configure the system for monitoring queues and identifying ways for reducing queue times.

Application servers 730, in turn, may be coupled to and capable of accessing one or more databases 750 including a profile database 742, an account database 754, transaction database 756, and/or the like. Databases 750 generally may store and maintain various types of information for use by application servers 730 and may comprise or be implemented by various types of computer storage devices (e.g., servers, memory) and/or database structures (e.g., relational, object-oriented, hierarchical, dimensional, network) in accordance with the described embodiments.

Figure 8:
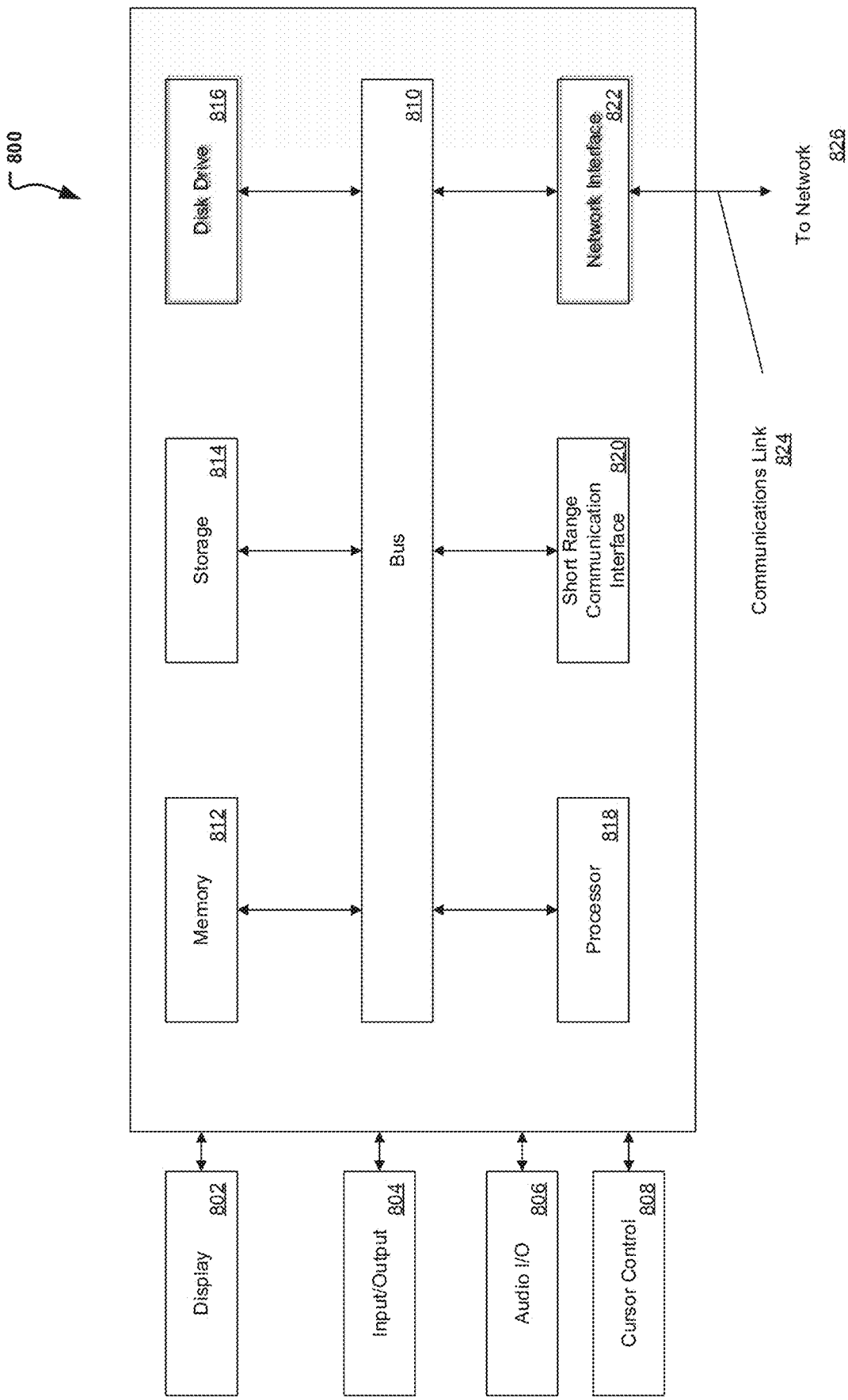
FIG. 8 illustrates an example block diagram of a computer system suitable for implementing one or more devices of the communication systems of FIGS. 1-7.

FIG. 8 illustrates an example computer system 800 in block diagram format suitable for implementing on one or more devices of the system in FIGS. 1-7. In various implementations, a device that includes computer system 800 may comprise a personal computing device (e.g., a smart or mobile device, a computing tablet, a personal computer, laptop, wearable device, PDA, etc.) that is capable of communicating with a network 826 (e.g., network 708). A service provider and/or a content provider may utilize a network computing device (e.g., a network server) capable of communicating with the network. It should be appreciated that each of the devices utilized by users, service providers, and content providers may be implemented as computer system 800 in a manner as follows.

Additionally, as more and more devices become communication capable, such as new smart devices using wireless communication to report, track, message, relay information and so forth, these devices may be part of computer system 800. For example, windows, walls, and other objects may double as touch screen devices for users to interact with. Such devices may be incorporated with the systems discussed herein.

Computer system 800 may include a bus 810 or other communication mechanisms for communicating information data, signals, and information between various components of computer system 800. Components include an input/output (I/O) component 804 that processes a user action, such as selecting keys from a keypad/keyboard, selecting one or more buttons, links, actuatable elements, etc., and sending a corresponding signal to bus 810. I/O component 804 may also include an output component, such as a display 802 and a cursor control 808 (such as a keyboard, keypad, mouse, touchscreen, etc.). In some examples, I/O component 804 other devices, such as another user device, a merchant server, an email server, application service provider, web server, a payment provider server, an ATM server, and/or other servers via a network. In various embodiments, such as for many cellular telephone and other mobile device embodiments, this transmission may be wireless, although other transmission mediums and methods may also be suitable. A processor 818, which may be a microcontroller, digital signal processor (DSP), or other processing component, that processes these various signals, such as for display on computer system 800 or transmission to other devices over a network 826 via a communication link 824. Again, communication link 824 may be a wireless communication in some embodiments. Processor 818 may also control transmission of information, such as cookies, IP addresses, images, and/or the like to other devices.

Components of computer system 800 also include a system memory component 814 (e.g., RAM), a static storage component 814 (e.g., ROM), and/or a disk drive 816. Computer system 800 performs specific operations by processor 818 and other components by executing one or more sequences of instructions contained in system memory component 812 (e.g., for engagement level determination). Logic may be encoded in a computer readable medium, which may refer to any medium that participates in providing instructions to processor 818 for execution. Such a medium may take many forms, including but not limited to, non-volatile media, volatile media, and/or transmission media. In various implementations, non-volatile media includes optical or magnetic disks, volatile media includes dynamic memory such as system memory component 812, and transmission media includes coaxial cables, copper wire, and fiber optics, including wires that comprise bus 810. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 800 may also include a short range communications interface 820. Short range communications interface 820, in various embodiments, may include transceiver circuitry, an antenna, and/or waveguide. Short range communications interface 820 may use one or more short-range wireless communication technologies, protocols, and/or standards (e.g., WiFi, Bluetooth®, Bluetooth Low Energy (BLE), infrared, NFC, etc.).

Short range communications interface 820, in various embodiments, may be configured to detect other devices (e.g., device 104, ATM 106, etc.) with short range communications technology near computer system 800. Short range communications interface 820 may create a communication area for detecting other devices with short range communication capabilities. When other devices with short range communications capabilities are placed in the communication area of short range communications interface 820, short range communications interface 820 may detect the other devices and exchange data with the other devices. Short range communications interface 820 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 820 may identify a local area network using a short range communications protocol, such as WiFi, and join the local area network. In some examples, computer system 800 may discover and/or communicate with other devices that are a part of the local area network using short range communications interface 820. In some embodiments, short range communications interface 820 may further exchange data and information with the other devices that are communicatively coupled with short range communications interface 820.

In various embodiments of the present disclosure, execution of instruction sequences to practice the present disclosure may be performed by computer system 800. In various other embodiments of the present disclosure, a plurality of computer systems 800 coupled by communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 824 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   receiving a first request from a user device of a user, the first request for a cardless cash access to an automated teller machine (ATM), the first request indicating that the user device is within a predetermined proximity from the ATM;
   predicting, by a digital wallet provider, a withdrawal amount to be withdrawn by the user from the ATM, the predicting based on information associated with the first request, a plurality of historical transactions previously processed by the digital wallet provider for the user device, and a global positioning system (GPS) location of the user device at a time the first request is received;
   causing the predicted withdrawal amount to automatically populate a user interface (UI) of a mobile application of the digital wallet provider running on the user device;
   accessing, based on the first request, user information associated with the user device;
   transmitting a token, to the ATM, for authorizing the user device with the ATM, the token displayable by the ATM as a QR code for scanning by the user device;
   receiving a scanned image of the QR code from the user device;
   causing, at least based on the scanned image of the QR code from the user device, a pairing of the ATM and the user device, the pairing comprising authorizing the user device for accessing an account associated with the user of the user device via the ATM, the causing further based on accessing pre-authentication indications for user-initiated transactions including the cardless cash access;
   based on the pairing of the ATM with the user device, authenticating the first request for the cardless cash access;
   based on the authenticating of the first request, updating an account balance associated with the user information based on the predicted withdrawal amount or a cash amount designated by the user and causing the ATM to dispense cash in the predicted withdrawal amount or in the cash amount; and
   transmitting a notification to the user device indicating a successful cash withdrawal for the predicted withdrawal amount or in the cash amount from the ATM.

2. The method of claim 1, wherein the UI includes a pop-up prompt that is displayed automatically based on detecting that the user device is within the predetermined proximity from the ATM, the pop-up prompt requesting the user to indicate whether to initiate a cash withdrawal from the ATM, the pop-up prompt further indicating a physical location of the ATM amongst a plurality of locations of other ATMs on a navigational map displayed in the UI of the user device.

3. The method of claim 1, wherein the pairing further comprises:
   onboarding the user based on determining that the user has not been onboarded, the onboarding comprising receiving, from the mobile application, the pre-authentication indications for the user-initiated transactions at a plurality of ATMs.

4. The method of claim 1, wherein the pairing comprises causing the user device and the ATM to exchange data for authentication of the user device for accessing the account via the ATM.

5. The method of claim 1, further comprising:
   receiving from the ATM, via a wireless connection, a second request of the user for the cash withdrawal from the ATM.

6. The method of claim 1, further comprising, before the predicting:
   based on the user information, identifying the plurality of historical transactions processed for the user device.

7. The method of claim 6, wherein the plurality of historical transactions includes a withdrawn amount of a previous transaction of the plurality of historical transactions and a location of the previous transaction, wherein the location of the previous transaction is within the predetermined proximity to a physical location of the ATM.

8. The method of claim 1, wherein the first request indicates that the user device is within the predetermined proximity from the ATM by indicating the GPS location of the user device.

9. A system, comprising:
   a non-transitory memory storing instructions; and
   a processor configured to execute the instructions to cause the system to:
      receive, over a first network, a first request from a user device of a user, the first request for a cardless cash access to an automated teller machine (ATM), the first request indicating that the user device is within a certain distance from the ATM;
      cause a pop-up prompt to be displayed via a user interface (UI) of a mobile application of a digital wallet provider executing on the user device, the pop-up prompt including an entry field for a withdrawal amount to be withdrawn from the ATM;
      predict, by the digital wallet provider based on transaction amount data and location data associated with a plurality of historical transactions processed for the user device, the withdrawal amount;
      cause the withdrawal amount to be automatically populated in the entry field of the pop-up prompt;
      access, based on the first request, user information associated with the user device;
      transmit, to the ATM, a token for authorizing the user device with the ATM, the token for transmission by the ATM to the user device via a second network that is different from the first network;
      receive, over the first network, a copy of the token from the user device;
      cause, based on receiving the copy of the token from the user device, the ATM to pair with the user device at least in part by authorizing the ATM to access an account of the user of the user device for processing the first request from the user device, wherein a pairing of the ATM with the user device is further based on accessing pre-authentication indications for user-initiated transactions including the cardless cash access;

based on the pairing of the ATM with the user device, authenticate the first request for the cardless cash access;

after the first request has been authenticated, update an account balance associated with the user information based on the withdrawal amount or a cash amount designated by the user and cause the ATM to dispense cash in the withdrawal amount or in the cash amount; and transmit a notification to the user device indicating a successful cash withdrawal for the withdrawal amount or the cash amount from the ATM.

10. The system of claim 9, wherein the second network comprises a Near-Field Communication (NFC) network.

11. The system of claim 9, wherein the pop-up prompt further indicates a physical location of the ATM amongst a plurality of locations of other ATMs on a navigational map displayed in the UI of the user device.

12. The system of claim 9, wherein the executing instructions further causes the system to:
onboard the user based on a determination that the user has not been onboarded, wherein the user is onboarded by receiving, from the mobile application, the pre-authentication indications for the user-initiated transactions at a plurality of ATMs.

13. The system of claim 9, wherein the pairing comprises the user device and the ATM exchanging data for authentication of the user device for accessing the account via the ATM.

14. The system of claim 9, wherein the executing instructions further causes the system to:
based on the user information, identify the plurality of historical transactions processed for the user device.

15. The system of claim 9, wherein the first request indicates that the user device is within predetermined proximity from the ATM by indicating a global positioning system (GPS) location of the user device.

16. A non-transitory machine-readable medium having stored thereon machine-readable instructions executable to cause a machine to perform operations comprising:
receiving, over a first network, a first request from a user device of a user, the first request for a cardless cash access to an automated teller machine (ATM);
determining, by a digital wallet provider before input is received from the user, a first cash amount to be withdrawn from the ATM, the determining based on information associated with the first request, a plurality of transactions previously processed for the user device, and a global positioning system (GPS) location of the user device;
causing a user interface (UI) of a mobile application of the digital wallet provider executing on the user device to be automatically populated at least in part by the first cash amount;
accessing, based on the first request, user information associated with the user device;
transmitting, to the ATM, a token for authorizing the user device with the ATM, the token for transmission by the ATM to the user device via a second network that is different from the first network;
receiving, over the first network, a copy of the token from the user device;
pairing, at least based on receiving the copy of the token from the user device, the ATM with the user device, the pairing comprising authorizing the ATM to access an account of the user of the user device for processing the first request from the user device, the causing further based on accessing pre-authentication indications for user-initiated transactions including the cardless cash access;
based on the pairing of the ATM with the user device, authenticating the first request for the cardless cash access;
based on the authenticating of the first request, updating an account balance associated with the user information based on the first cash amount or a second cash amount designated by the user and causing the ATM to dispense cash in the first cash amount or in the second cash amount; and
transmitting a notification to the user device indicating a successful cash withdrawal for the first cash amount or in the second cash amount from the ATM.

17. The non-transitory machine-readable medium of claim 16, wherein the operations further comprise:
based on detecting that the user device is within a certain distance of the ATM, causing a pop-up prompt to be displayed on a user interface of the mobile application, the pop-up prompt being a part of the mobile application and requesting that the user indicates whether to initiate a cash withdrawal from the ATM, the pop-up prompt further indicating a physical location of the ATM amongst a plurality of locations of other ATMs on a navigational map displayed in the UI of the user device.

18. The non-transitory machine-readable medium of claim 16, wherein the operations further comprise:
onboarding the user based on a determination that the user has not been onboarded, the onboarding comprising receiving, from the user device, the pre-authentication indications for the user-initiated transactions at a plurality of ATMs.

19. The non-transitory machine-readable medium of claim 16, wherein the operations further comprise causing the user device and the ATM to exchange data for authentication of the user device for accessing user account via the ATM.

20. The non-transitory machine-readable medium of claim 16, wherein the second network comprises a Near-Field Communication (NFC) network.

* * * * *